No. 850,920. PATENTED APR. 23, 1907.
H. D. GARDINER.
BALANCE WHEEL FOR CLOCKS.
APPLICATION FILED MAY 4, 1906.
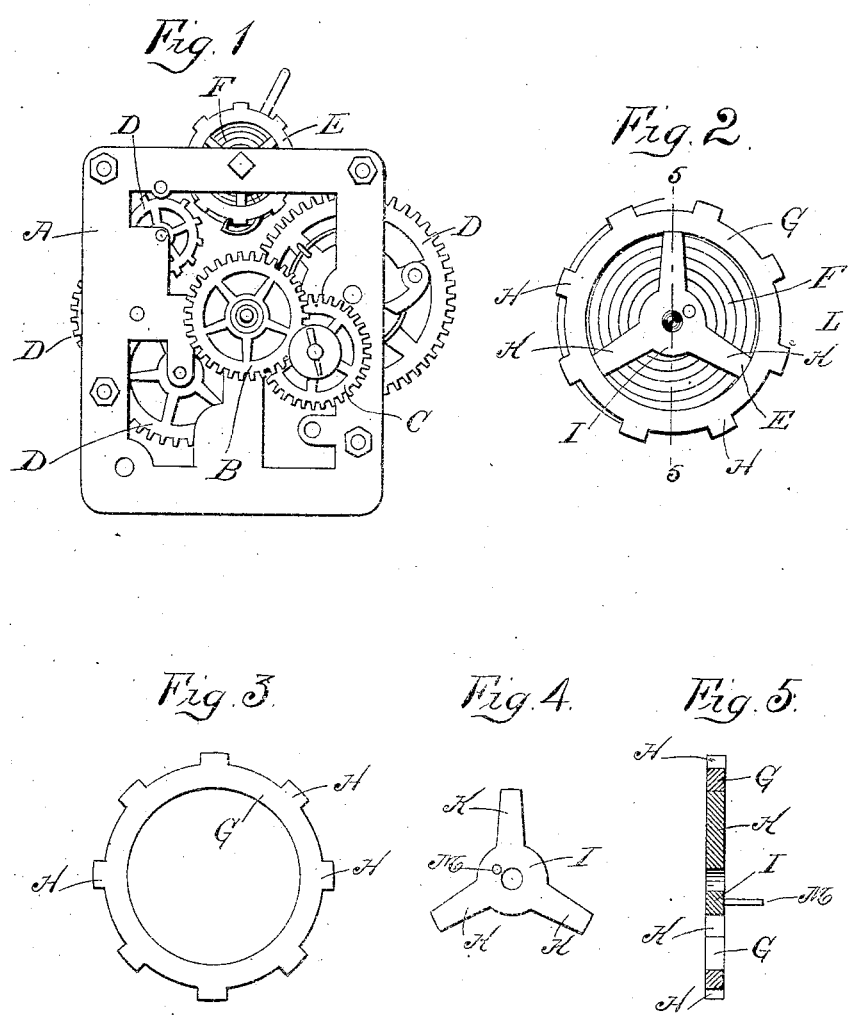

UNITED STATES PATENT OFFICE.

HENRY D. GARDINER, OF NEW HAVEN, CONNECTICUT.

BALANCE-WHEEL FOR CLOCKS.

No. 850,920. Specification of Letters Patent. Patented April 23, 1907.

Application filed May 4, 1906. Serial No. 315,223.

*To all whom it may concern:*

Be it known that I, HENRY D. GARDINER, of the city and county of New Haven and State of Connecticut, have invented new and useful Improvements in Balance-Wheels for Clocks and Similar Instruments, of which the following is a full, clear, and exact description when taken in connection with the accompanying drawings, which form a part thereof, and in which—

Figure 1 represents a front elevation of a clock having a balance-wheel embodying the present invention; Fig. 2, a front detailed view of the balance-wheel and spring; Fig. 3, a detailed view of the rim of the balance-wheel; Fig. 4, a detailed view of the spokes and hub of the balance-wheel, and Fig. 5 a transverse central vertical section through the wheel.

In all figures similar letters of reference represent like parts.

This invention relates to balance-wheels for clocks, and has for its object the production of a balance-wheel in which the spokes and hub are formed of lighter metal, such as aluminium, than the rim, while the two parts are of equal thickness throughout, so that increased momentum is obtained, while any irregularity in the form of the wheel is obviated.

Hitherto balance-wheels have been formed with their spokes and hub of the same metal as the rim; but in order to increase the relative weight of the rim the spokes and hub have been swept out. Difficulties in this construction have been the unevenness in the weight of the wheel if one side of the spokes is swept out more than the other and because of the thinness of the spokes the liability of breakage. In the present invention both of these difficulties are obviated, and, furthermore, by the use of a metal like aluminium the operations in the construction of the balance-wheel are lessened. The spokes and hub do not need to be swept out, and, furthermore, the shaft of the wheel may be driven through the hub without the need of previous drilling therefor; also, the same operation of drilling may be obviated in securing the impulse-pin in place.

To these and other ends the invention consists in the several improvements and combinations of parts set forth and claimed hereinafter.

Referring to the drawings for a more particular description of the invention, the part designated by the letter A represents the front movement-plate of the frame of the clock, and B and C the dial-wheels.

D represents other wheels of an ordinary clock-movement, and E the balance-wheel, and F the balance-spring. The balance-wheel, as shown more particularly in Figs. 3 and 4, is formed in two parts. The rim G is formed of brass or the ordinary metal for such wheels, and is provided with the usual protuberances or projections H. The other part of the wheel, consising of the hub I and spokes K, is formed of lighter metal, as aluminium, and through the hub is driven the shaft L without prior drilling therefor. Because of the nature of the metal used for the hub the drilling of a perforation for the shaft is obviated. Furthermore, the impulse-pin M is driven into the hub of the wheel without any previous drilling of the hub therefor, and the two parts of the wheel are readily and easily assembled by fitting the spokes in the rim G, Fig. 2.

As shown more particularly in Fig. 5, the hub and spokes are of the same thickness as the rim, so that there is little liability of any breakage of the spokes and the wheels may be trued with ease as there is no tendency toward lateral displacement because of the greater weight on one side or the other of the wheel.

Having now described my invention, what I claim, and desire to secure by Letters Patent, is—

1. A balance-wheel formed of two parts of equal thickness; the spokes and hub being formed of lighter metal than the rim, substantially as described.

2. The combination in a balance-wheel, with the rim; of separate spokes and hub formed of lighter metal than the rim and being of the same thickness therewith, substantially as described.

3. The combination in a balance-wheel, with the rim; of separate spokes and hub of the same thickness with the rim, but formed of lighter metal than the rim; a shaft driven through said hub without previous drilling of a perforation therefor, substantially as described.

4. A balance-wheel of uniform thickness throughout, having its spokes and hub formed separate from the rim and of lighter metal than the rim, substantially as described.

In witness whereof I have hereunto set my hand on the 30th day of April, 1906.

HENRY D. GARDINER.

Witnesses:
  H. E. COOPER,
  SAMUEL H. FISHER.